Oct. 29, 1968   S. EPSTEIN   3,408,093
TUBULAR CONNECTOR UNION
Filed Dec. 14, 1966

INVENTOR.
SAUL EPSTEIN
BY Herzig, Walsh & Blackhoury
ATTORNEYS

United States Patent Office 3,408,093
Patented Oct. 29, 1968

3,408,093
TUBULAR CONNECTOR UNION
Saul Epstein, Los Angeles, Calif., assignor to American Metal Products Corp., Los Angeles, Calif., a corporation of California
Filed Dec. 14, 1966, Ser. No. 601,758
1 Claim. (Cl. 285—52)

ABSTRACT OF THE DISCLOSURE

An improved and simplified water connector union adapted for connecting thin walled copper connector tubes to rigid pipe without the necessity of special fittings. A single union or internally threaded nut is used on the end of the rigid pipe. It has an internal annular bevel. The end of the thin walled tubing has an annular crimp or rib which cooperates with the internal annular bevel in the union. A rubber washer or gasket fits around the end of the thin walled tubing and is trapped between the crimp in the tubing, the end of the rigid tube, and the inside of the nut or union. The end of the threaded pipe fits directly against the rubber washer and an effective seal is provided. No additional fitting, sleeve, or supporting ring is required.

Summary of the invention

The invention is a connector union adapted for connecting thin walled connector tubing to a rigid pipe. A single union member or internally threaded nut is used. No separate adapter fitting is required to adapt to the end of the threaded pipe. The union member or internally threaded nut has an internal annular bevel. The thin walled connector pipe is ordinarily corrugated with a smooth end. This smooth end has a crimp forming an annular rib adapted to engage and cooperate with the internal bevel in the union member. A resilient washer fits over the end of the tubing and against the annular crimp. The threaded end of the rigid tube abuts directly against the washer which is trapped between the smooth end of the tube, the annular crimp and the inside of the union member. An effective seal is thus provided, not subject to close tolerances in assembling and without the use of an additional fitting, sleeve, or supporting ring.

Specification

The invention relates to a connector union as described. Its purpose and object is to provide a simplified but effective union or coupling eliminating parts as set forth in the foregoing. In prior art devices, an additional fitting was required, or, on the other hand, in some assemblies the construction was such that if a rubber washer were used, it was necessary to provide an additional member on the inside of it to prevent it from collapsing and being rendered ineffective. Such member might be in the form of a sleeve or ring. A further object of the invention is to overcome these deficiencies and to provide a more simplified and effective connector union.

Further objects and additional advantages of the invention will become apparent from the following detailed description and annexed drawings wherein.

Figure 1:
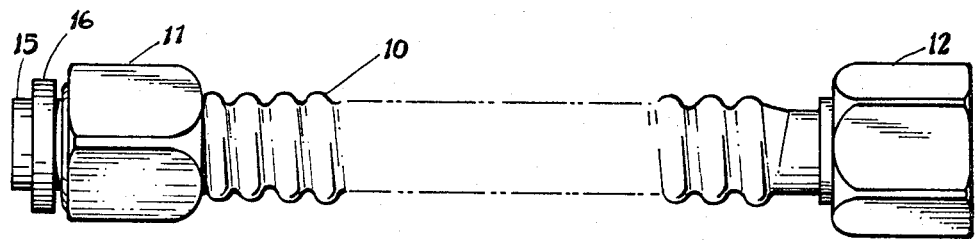
FIGURE 1 is an external view of a preferred form of the invention.
Figure 2:
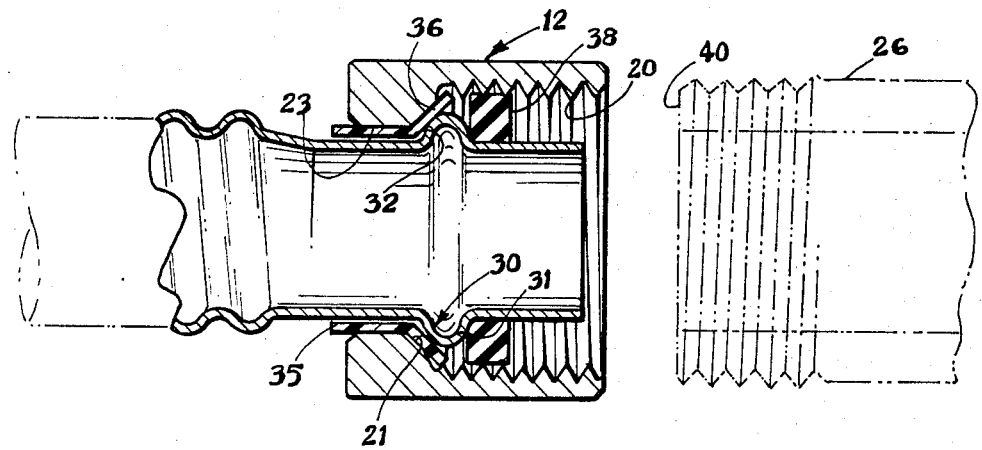
FIGURE 2 is a cross-sectional view of the coupling of the invention.
Figure 3:
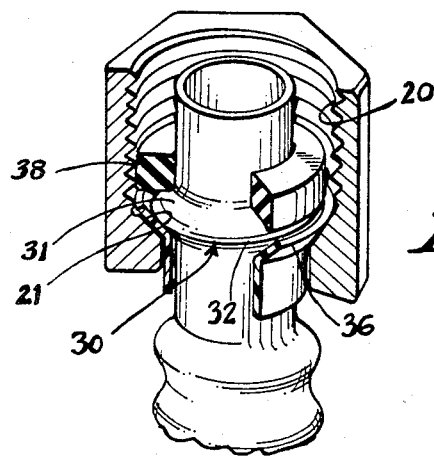
FIGURE 3 is a cutaway perspective view of the connector union or coupling of the invention.

Referring now more particularly to FIGURE 1 of the drawings, it shows a section of thin walled corrugated copper tubing 10 which, by way of example, represents a water connector that is to be coupled to rigid piping. At the ends of the tubing 10 are union members 11 and 12, each of which is in the form of an internally threaded union member or nut as shown in FIGURES 2 and 3. The union member 11 in FIGURE 1 is shown slipped back towards the corrugated part of the tube, exposing the smooth end part 15, and the rubber washer 16 which fits inside of the union member 11.

The construction is shown more in detail in FIGURES 2 and 3. The union member 12 is internally threaded, as shown at 20. It has an internal annular bevel, as shown at 21, and a bore at the left end of smaller diameter, as shown at 23. Numeral 26 designates the pipe that is to be coupled to the tubing 10 by the nut or union 12. The bore 23 in the union 12 is of such size that it will not slip over the corrugated tubing 10. In other words, the nut 12 has to be put on from the right end of the tubing 10 looking at FIGURE 2.

Formed in the smooth end 15 of the tubing 10 is a crimp 30 which is formed while the nut 12 is in position on the end of the tubing. This crimp is annular, forming one shoulder 31 and a shoulder 32 complementary to the internal bevel 21 in the nut 12. Numeral 35 designates a sleeve of dielectric material that fits around the smooth part 15 of the tubing 10. It has a flare 36 at the end forming a bevel complementary to the internal bevel 21 and the slanting part 32 of the crimp 30. The flared end 36 of the dielectric tube 35 engages between the internal bevel 21 in the nut 12 and the slanting part 32 of the crimp 30. The purpose of the dielectric tube 35 is to prevent electrolytic action between the parts.

Numeral 38 designates a rubber washer that fits around the smooth end of the tubing 10 and against the radial shoulder 31 of the crimp 30. The end of the pipe 26, as shown at 40, abuts directly against the rubber washer 38 which is trapped between the crimp 30 and the inside diameter of the nut or union 12.

From the foregoing, those skilled in the art will observe and understand the nature of the invention and its utilization, and the manner in which it accomplishes and realizes the objects and advantages as set forth in the foregoing. The washer 38 is compressed directly against the crimp 30. No special or separate fitting is required within the union 12. The washer 38 is trapped between the crimp 30 and the inside diameter of the fitting 12. The end 40 of the pipe 26 can compress the washer 38 without deforming it out of position and without impairing its sealing capabilities. The washer 38 is not subject to close tolerances in fabrication or assembly but, nevertheless, the effectiveness of the seal is preserved.

The foregoing disclosure is representative of a preferred form of the invention and is to be interpreted in an illustrative rather than a limiting sense, the invention to be accorded the full scope of the claims appended hereto.

What is claimed is:

1. A connector union for connecting thin-walled tubing to a threaded pipe end, said pipe having an internal diameter, comprising: a union member having an internally threaded first bore for receiving said pipe end, and a second cylindrical bore of smaller diameter coaxial to said first bore; a conical shoulder at the juncture of said bores; a section of thin-walled tubing, of smaller diameter than said second bore, extending through said second bore and substantially through said first bore; an integral annular, axially curved hollow rib around said tubing adjacent said shoulder, of greater diameter than said second bore but spaced axially inwardly from the end of said tubing to leave a cylindrical end portion on said tubing in said first bore of a diameter less than said internal diameter of said pipe, said tubing and rib being of uniform wall thickness; a resilient sealing washer on said cylindrical end portion of said tubing, abutting said rib, and extending radially to the threaded surface of said first bore and adapted to be engaged and compressed by the end of said pipe; and a sleeve of dielectric material having a cylindrical portion extending through said second bore around said tubing, and a conically flared end lying against said shoulder and insulating said rib from said shoulder.

References Cited

UNITED STATES PATENTS

| | | | |
|---|---|---|---|
| 764,603 | 7/1904 | Lambert | 285—52 X |
| 926,075 | 6/1909 | Read et al. | 285—354 X |
| 1,533,886 | 4/1925 | Mueller et al. | 285—347 X |
| 2,428,143 | 9/1947 | Chavayda | 285—233 |
| 2,578,933 | 12/1951 | Hunter et al. | 285—52 X |
| 2,631,049 | 3/1953 | McGillis et al. | 285—354 |

FOREIGN PATENTS 409,971   3/1945   Italy.

EDWARD C. ALLEN, *Primary Examiner.*

T. F. CALLAGHAN, *Assistant Examiner.*